(12) United States Patent
Arroyo et al.

(10) Patent No.: US 9,569,373 B2
(45) Date of Patent: *Feb. 14, 2017

(54) SHARING MESSAGE-SIGNALED INTERRUPTS BETWEEN PERIPHERAL COMPONENT INTERCONNECT (PCI) I/O DEVICES

(71) Applicant: International Business Machines Corporation, Armonk, NY (US)

(72) Inventors: Jesse P. Arroyo, Rochester, MN (US); Anjan Kumar Guttahalli Krishna, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/264,272

(22) Filed: Apr. 29, 2014

(65) Prior Publication Data
US 2015/0301967 A1    Oct. 22, 2015

Related U.S. Application Data

(63) Continuation of application No. 14/254,995, filed on Apr. 17, 2014.

(51) Int. Cl.
*G06F 13/32* (2006.01)
*G06F 13/10* (2006.01)
*G06F 13/42* (2006.01)

(52) U.S. Cl.
CPC .............. *G06F 13/102* (2013.01); *G06F 13/32* (2013.01); *G06F 13/4221* (2013.01); *G06F 2213/0024* (2013.01); *G06F 2213/0058* (2013.01)

(58) Field of Classification Search
CPC .... G06F 13/32; G06F 13/4221; G06F 13/102; G06F 2213/0024; G06F 2213/0058
See application file for complete search history.

(56) References Cited

U.S. PATENT DOCUMENTS

2008/0126617 A1    5/2008    Brownlow et al.
2008/0126648 A1    5/2008    Brownlow et al.
(Continued)

OTHER PUBLICATIONS

Yang, Wei et al., Enable SRIOV in PowerNV mode on Power7 Platform, IBM Linux Technology Center, Feb. 2007, International Business Machines Corporation, Armonk, United States.
(Continued)

*Primary Examiner* — Glenn A Auve
(74) *Attorney, Agent, or Firm* — Patterson & Sheridan, LLP

(57) ABSTRACT

A PCI function, such as a device driver, may request that additional MSI resources be allocated to an I/O device coupled to a PCI Host Bridge (PHB). However, there may not be any unallocated MSI resource remaining in the PHB. Instead, a hypervisor may request to borrow MSI resources assigned to other PCI functions in the system. For example, the PCI function requesting the additional MSI resources may ask for a certain number of MSI resources for a certain period of time—e.g., a lease. The hypervisor then determines which of the other PCI functions (referred to as a loaning PCI functions) are willing to lend or loan their MSI resources. Once the MSI resources available for lease are known, the hypervisor informs the requesting PCI function of these resources which, in turn, binds the additional MSI resources to the I/O device.

7 Claims, 6 Drawing Sheets

(56) References Cited

U.S. PATENT DOCUMENTS

2012/0036298 A1 2/2012 Lais et al.
2015/0301966 A1* 10/2015 Arroyo ................ G06F 13/102
710/313

OTHER PUBLICATIONS

Budruk, Ravi, PCI Express Basics, PCI-SIG Developers Conference, 2007, PCI-SIG, Beaverton, United States.
U.S. Appl. No. 14/254,995, entitled Sharing Message-Signaled Interrupts Between Peripheral Component Interconnect (PCI) I/O Devices, filed Apr. 17, 2014.

* cited by examiner

SHARING MESSAGE-SIGNALED INTERRUPTS BETWEEN PERIPHERAL COMPONENT INTERCONNECT (PCI) I/O DEVICES

CROSS-REFERENCE TO RELATED APPLICATIONS

This application is a continuation of co-pending U.S. patent application Ser. No. 14/254,995, filed Apr. 17, 2014. The aforementioned related patent application is herein incorporated by reference in its entirety.

BACKGROUND

Interrupts may be used to notify the device driver of asynchronous events—keyboard presses, incoming data traffic from a network adapter, completion of a read from/write to a storage device, and to notify the device driver of an error. In the case of storage and networking, to increase performance, the work can be divided among different threads, with each thread notified by one or more interrupts.

In Peripheral Component Interconnect (PCI) or PCI Express (PCIe) there are mainly two types of interrupt mechanisms: Legacy/Level Signaled Interrupts (LSIs) and Message Signaled Interrupts (MSIs). In case of the LSIs, an input/output (I/O) device has an interrupt pin which it asserts when the device wants to signal an interrupt to the host processing environment. This traditional form of interrupt signaling is an out-of-band form of control signaling since LSI uses a separate dedicated path relative to the main data path to send such control information. With complex I/O fabrics, however, the number of dedicated lines or pins that would be required to provide interrupt functionality for all of the I/O resources connected to the fabric may be impractical. As a result, more complex I/O fabrics may implement MSIs by writing data to specific memory addresses in the system address space. MSIs, which are in-band method of signaling an interrupt, allow the device to write a small amount of data to a special memory-mapped I/O address which is then delivered to the appropriate destination—e.g., a processor.

As an example of a computer system using MSIs, a PCI-enabled I/O device may issue MSIs as DMA writes where the DMA address is a MSI port in a PCI Host Bridge (PHB) and the DMA write data is an interrupt number selected from a range of interrupt numbers enabled at the MSI port. The PHB decodes the MSI port address on the PCI bus and uses the interrupt number in the DMA write data to present the PCI interrupt to the appropriate virtual machine or processor. To configure MSI in the I/O device, a Hypervisor presents the virtual machine with the MSI properties of the PHB. These properties consist of the number of MSI ports and the number of MSI interrupts the PHB provides. When the PHB supports multiple I/O devices, these MSI resources are divided amongst the virtual machines that control I/O devices connected to the PHB.

SUMMARY

One embodiment provided herein is a method for sharing MSI resources. The method includes, upon receiving a first request to increase MSI resources allocated to a first PCI-enabled I/O device coupled to a PHB, identifying at least a second PCI-enabled I/O device that is allocated MSI resources. The method also includes transmitting a second request to a managing entity corresponding to the second I/O device where the second request indicates a desired number of MSI resources and a desired lease time. The method includes receiving a confirmation from the managing entity where the confirmation indicates a number of MSI resources available for lease from the second I/O device and a negotiated lease time associated with each of the MSI resources available for lease and allocating at least one of the MSI resources available for lease to the first I/O device.

Another embodiment described herein is a computer system that includes a first PCI-enabled I/O device, a second PCI-enabled I/O device that is allocated MSI resources, a PHB coupled to the first and second I/O devices, and a hypervisor. The hypervisor is configured to, upon receiving a first request to increase MSI resources allocated to the first I/O device, transmitting a second request to a managing entity corresponding to the second I/O device where the second request indicates a desired number of MSI resources and a desired lease time. The hypervisor is also configured to receive a confirmation from the managing entity where the confirmation indicates a number of MSI resources available for lease from the second I/O device and a negotiated lease time associated with each of the MSI resources available for lease where at least one of the MSI resources available for lease are allocated to the first I/O device based on the negotiated lease time.

Another embodiment described herein is a computer program product for sharing MSI resources. The computer program product includes computer-readable program code configured to, upon receiving a first request to increase MSI resources allocated to a first PCI-enabled I/O device coupled to a PHB, identify at least a second PCI-enabled I/O device that is allocated MSI resources. The program code is also configured to transmit a second request to a managing entity corresponding to the second I/O device where the second request indicates a desired number of MSI resources and a desired lease time. The program code is configured to receive a confirmation from the managing entity where the confirmation indicates a number of MSI resources available for lease from the second I/O device and a negotiated lease time associated with each of the MSI resources available for lease and allocate at least one of the MSI resources available for lease to the first I/O device.

DETAILED DESCRIPTION

Figure 1:
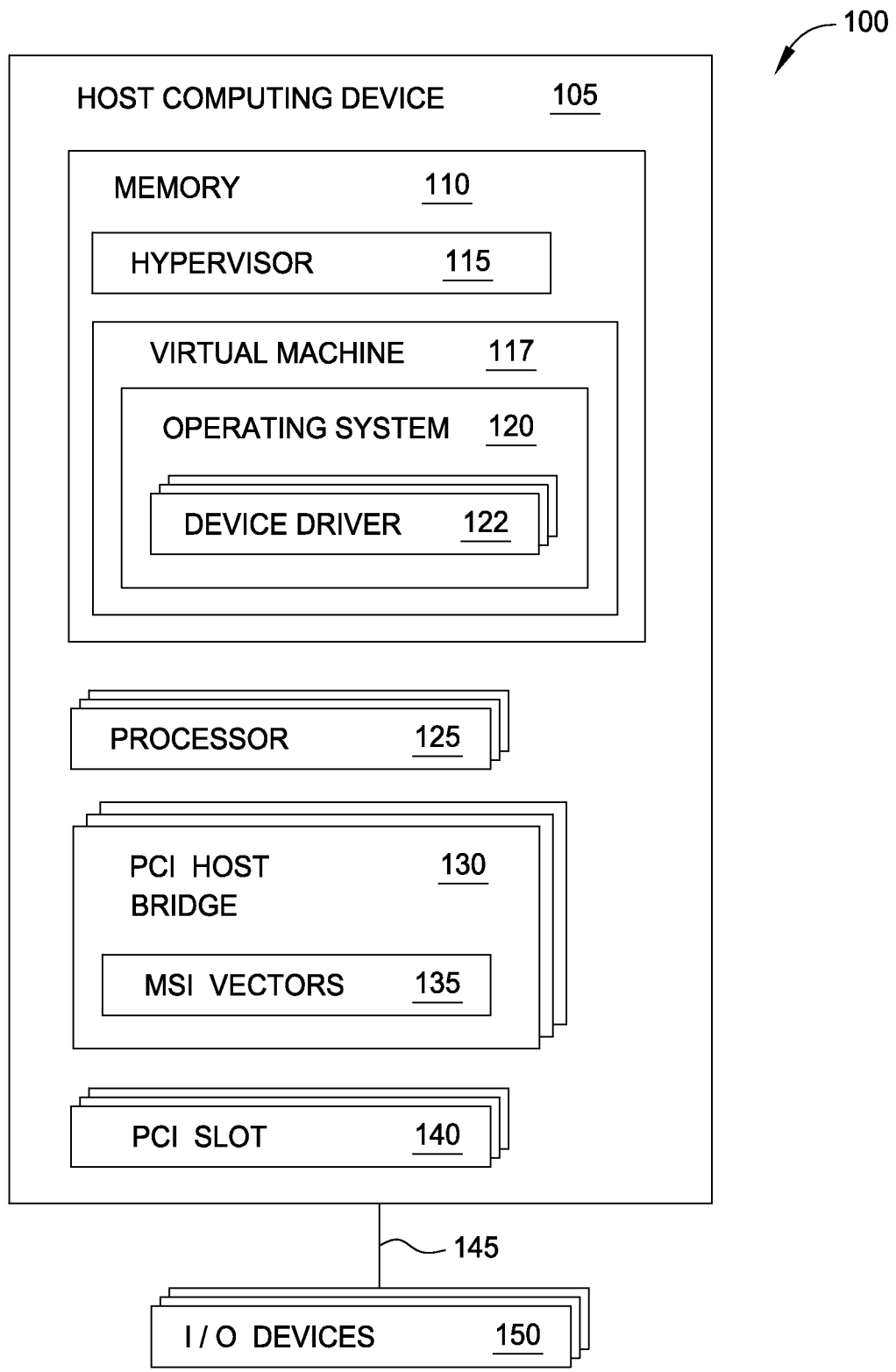
FIG. 1 illustrates a computer system that uses PCI communication, according to one embodiment described herein.

A MSI vector defines where the interrupt is to be routed (e.g., what processor core or thread) and the interrupt's relative priority. By definition, MSIs vectors are exclusive to a system and are unshared. Each MSI vector is triggered by an operation such as a MSI/direct memory address (DMA) write to a particular address with specific data on the PCI bus received by a PCI host bridge (PHB). Thus, any I/O device on the PCI bus can be given the address/data combination to activate that MSI vector. Each MSI vector assigned to an I/O device is guaranteed to be a unique in the computing system and is associated with a unique memory address (e.g., a special memory-mapped I/O address), either in register space or system memory. For example, a device driver can request a certain number of MSI interrupt vectors, but a hypervisor or BIOS can allocate fewer MSI vectors to the device driver than the function requested depending upon the various factors such as the availability of unallocated MSI vectors. In one embodiment, the total number of MSI vectors assigned to a PHB caps the number of MSI vectors that can be allocated to I/O devices connected to the PHB. For example, if the PHB is assigned 2048 MSI vectors and connected to five I/O devices, no one I/O device can be allocated more than 2048 MSI vectors.

Even after an I/O device has been allocated a set of MSI vectors, its needs may change. For example, the I/O device may be part of a payroll application where the I/O demands of the application increase when the monthly payroll is calculated. During all other times, the set of MSI vectors allocated to the I/O devices may be sufficient. To increase the ability of the application when calculating the monthly payroll, the device driver associated with the I/O device may request additional MSI vectors. However, there may not be any unallocated MSI vectors (i.e., MSI vectors not allocated to any I/O device) remaining.

In one embodiment, the hypervisor may request to borrow MSI vectors assigned to other I/O devices in the system. For example, a device driver can ask for additional MSI vectors by sending a request for a certain number of MSI vectors for a certain period of time—e.g., a lease. Using the payroll example above, the device driver may request that the hypervisor double the amount of its allocated MSI vectors for a twenty-four hour period. The hypervisor then negotiates with other device drivers (referred to as loaning device drivers) that are willing to lend or loan their MSI vectors. In one embodiment, each of the loaning device drivers may have I/O devices coupled to the same PHB as an I/O device corresponding to the requesting device driver.

Each loaning device driver may weigh the request to its own needs (e.g., whether the loaning device driver is currently using all of its allocated MSI vectors) as well as the loan period proposed by the requesting device driver (e.g., the loaning device driver may not currently be using all of its MSI vectors but may need before the lease expires). The loaning device driver then indicates how many MSI vectors it is willing to loan and for how long. The hypervisor returns the results of the negotiations to the requesting device driver. For example, the hypervisor may be able to fully satisfy the request or only able to satisfy a portion of the requested MSI vectors. Regardless, the requesting device driver may then bind the additional MSI vectors to the I/O device which can begin to use the added MSI vectors for transmitting interrupts.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 illustrates a computer device that uses PCI communication, according to one embodiment described herein. System 100 includes a host computing device 105 coupled to one or more I/O devices 150. As used herein, PCI refers to conventional PCI, PCI Express, or any variant thereof. A link 145 represents that the I/O devices 150 are communicatively coupled to the host computing device 105—e.g., the devices 150 are coupled to the PCI slots 140.

Host computing device 105 includes a memory 110, one or more processors 125, one or more PHBs 130, and one or more PCI slots 140. Memory 110 may include volatile memory elements, non-volatile memory elements, or a combination of both. For example, memory 110 may include both RAM and a hard disk drive which are used in combination to store data associated with host computing device 105. Here, memory 110 stores a hypervisor 115 and at least one virtual machine 117 executing on the host computing device 105. For example, host computing device 105 may be a server whose hardware is used to host a plurality of virtual machines 117. In one embodiment, the host computing device 105 uses the hypervisor 115 to manage and configure the various virtual machines 117. Although the hypervisor 115 is shown as software, in other embodiments, hypervisor 115 may be implemented using firmware or hardware.

In one embodiment, virtual machine 117 is a software implemented abstraction of the underlying hardware in the host computing device 105. As such, each virtual machine 117 may provide a complete system platform which supports the execution of an operating system 120. However, the advantages and details of using and implementing virtual machines 117 will not be discussed in detail here.

The virtual machine 117 includes an operating system 120 which may be any operating system suitable for performing the functions described herein. The operating system 120 includes one or more device drivers 122 which may perform PCI functions. For example, each device driver 122 may be a managing entity responsible for interfacing the virtual machine 117 with a corresponding I/O device or devices 150. Although a device driver 122 is specifically shown, any other managing entity may be used that controls, manages, or configures the I/O devices 150. As will be described in greater detail below, the device driver 122 may negotiate with the hypervisor 115 in order to determine the number of MSI vectors 135 allocated to the I/O device 150 managed by the device driver 122. In one example, the device driver 122 may borrow MSI vectors 135 assigned to other I/O devices 150 coupled to the same PHB 130.

The various system resources in the host computing device 105—e.g., virtual machine 117, operating system 120, processor 125, and the like—may communicate with the I/O devices 150 using the PCI slots 140. For example, virtual machines 117 may use the I/O devices 150 to expand their capabilities such as providing additional storage (e.g., memory cards or disk drives), specialized processing (e.g., video cards), specialized function (e.g., wireless cards), and the like. Further still, in one embodiment, the I/O devices 150 may be owned or assigned to a particular system resource and managed by a particular device driver 150. For example, each virtual machine 117 may be assigned a specific I/O device 150, or the memory space in an I/O device 150 may be separated into a plurality of partitions where each partition is assigned to a specific virtual machine 117. Although virtual machines 117 and processors 125 are examples of system resources in host computing device 105 that may communicate with the I/O devices 150, the embodiments described herein are not limited to such.

To facilitate communication between the system resources and the I/O devices 150, host computing device 105 includes PHB 130 and one or more PCI switches (not shown). Generally, PHB 130 provides an interface between PCI communication and a communication method used to transfer data within host computing device 105. For example, host computing device 105 may transfer data internally using a system bus and a parallel data communication method while some embodiments of PCI use serial communication to transmit data to and received data from the I/O devices 150. PHB 130 serves as an intermediary between these two communication techniques. Moreover, PHB 130 may perform memory translations between the memory space in the I/O devices 150 and memory 110 of the host computing device 105. As such, each PHB 130 may include a first interface that couples to a bus of the host computing device 105 (e.g., an ASIC interconnect bus) and a second interface that couples to the PCI switch. Having multiple PHBs 130 may be desirable for additional redundancy or to provide access to a larger variety of I/O devices 150.

In one embodiment, PHB 130 is a hardware unit (e.g., ASICs) mounted in the host computing device 105.

Although not shown, PHB 130 may include firmware or software that controls and monitors the functions of the PHB 130. Specifically, this firmware or software may include routing information and/or memory translation information that permits the PHB 130 to route requests from system resources in the host computing device 105 to the appropriate I/O device 150, and vice versa.

Figure 2:
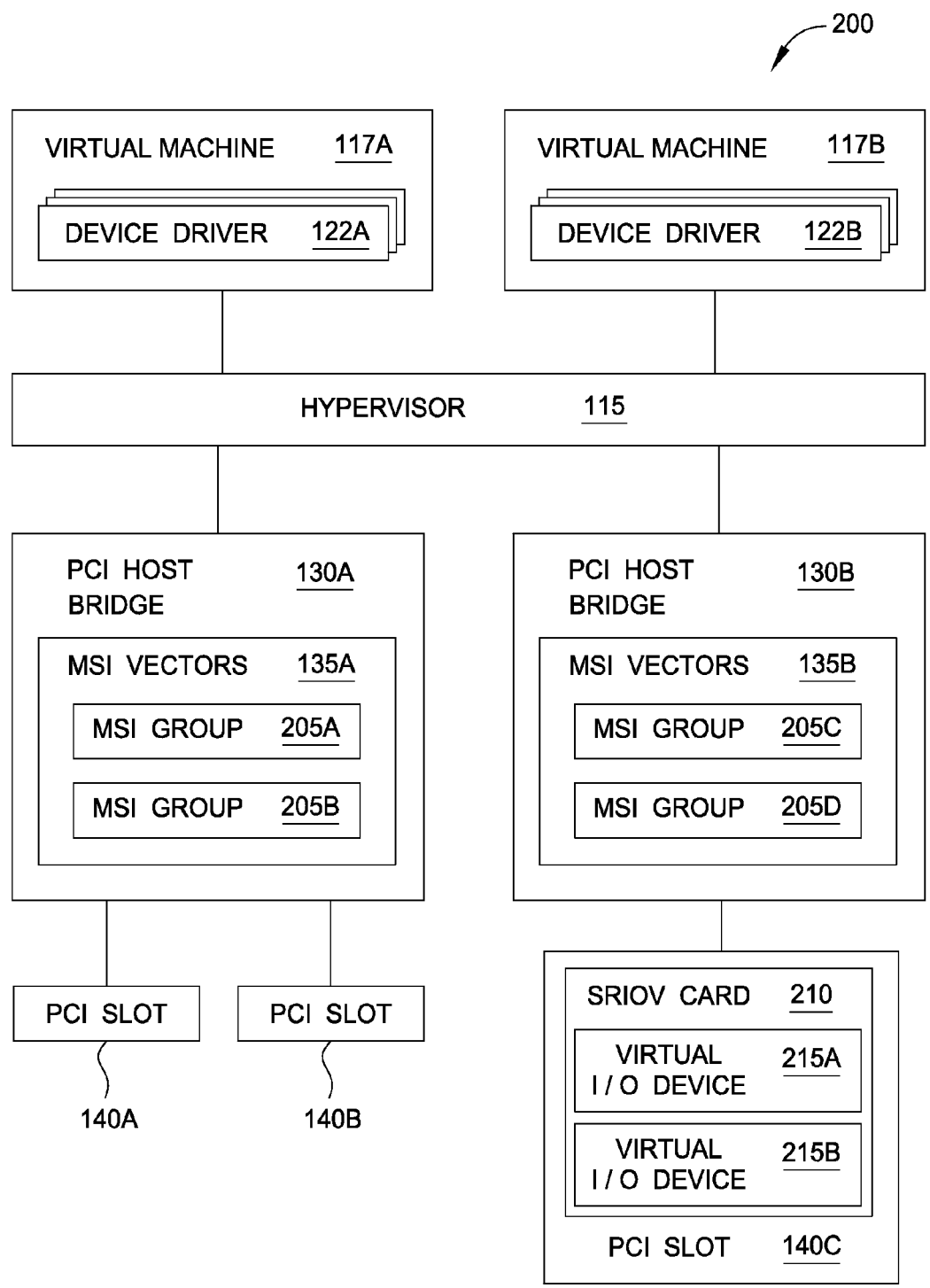
FIG. 2 illustrates a computing system with MSI vectors allocated to I/O devices, according to one embodiment described herein.

FIG. 2 illustrates a computing system 200 with MSI vectors 135 allocated to I/O devices, according to one embodiment described herein. Specifically, system 200 illustrates communication paths between various elements in computer system 100 of FIG. 1. As shown, the virtual machines 117A and 117B and the device drivers 122A and 122B are able to communicate with the hypervisor 115 which communicates with the PHBs 130A and 130B. The PHBs 130A have respective PCI connections to one or more PCI slots 140A-D which may be coupled to I/O devices.

In system 200, each PCI host bridge 130A-130B is assigned a set number of MSI vectors 135. The MSI vectors 135A and 135B illustrate the finite number of MSI vectors that can be assigned to the I/O devices connected to the PHBs 130 via the slots 140. For example, the hypervisor 115 may instruct the PHBs 130 to allocate the available MSI vectors into MSI vector groups 205 that are then allocated to each I/O device. For instance, MSI vector group 205A may include all the MSI vectors assigned to the I/O device attached to PCI slot 140A, MSI vector group 205B includes all the MSI vectors assigned to the I/O device attached to PCI slot 140B, and so forth. Furthermore, FIG. 2 illustrates that multiple groups of MSI vectors may be assigned to a single I/O device such as a Single Root I/O Virtualization (SRIOV) adapter/card 210 that may be partitionable into multiple virtual I/O devices 215. As shown, the SRIOV adapter 210 is connected to PCI slot 140C but multiple MSI vector groups (e.g., MSI vector group 205C and 205D) may be allocated to the SRIOV adapter 210. For instance, MSI group 205C may be allocated to virtual I/O device 215A while MSI group 205D is allocated to virtual I/O device 215B. MSI vectors can be loaned or moved between virtual functions on the SRIOV adapter 210 to, for example, support different protocols on the same SRIOV adapter. Moreover, the different virtual functions could belong to different virtual machines on the same managed system. In one embodiment, if the SRIOV adapter 210 adds new virtual functions or increases traffic across the already configured virtual functions, MSI vectors may be loaned from other virtual functions or from other I/O devices connected to PHB 130B.

As will be discussed in greater detail below, the device drivers 122 may negotiate with the hypervisor 115 to determine how many MSI vectors 135 are allocated to the I/O device (or devices) managed by the driver 122—i.e., changing the number of MSI vectors 135 in the I/O device's group 205. The size of the MSI vector groups 205A-D may be different depending on, for example, the number of DMA reads/write performed by the I/O device, priority of the applications that use the I/O device, number of available MSI vectors associated with the PHB 130, and the like. Furthermore, after an I/O device is assigned a set of MSI vectors 135, its associated device driver 122 may request additional MSI vectors 135 be added to its group 205. If no unallocated MSI vectors 135 are available, the hypervisor 115 contacts other device drivers 122 to see if they are able to lease MSI vectors 135 in their groups 205 to the requesting device driver 122. In this manner, the size of the MSI groups 205 may change dynamically as the device drivers 122 share, or lease out, their MSI vectors 135.

Figure 3:
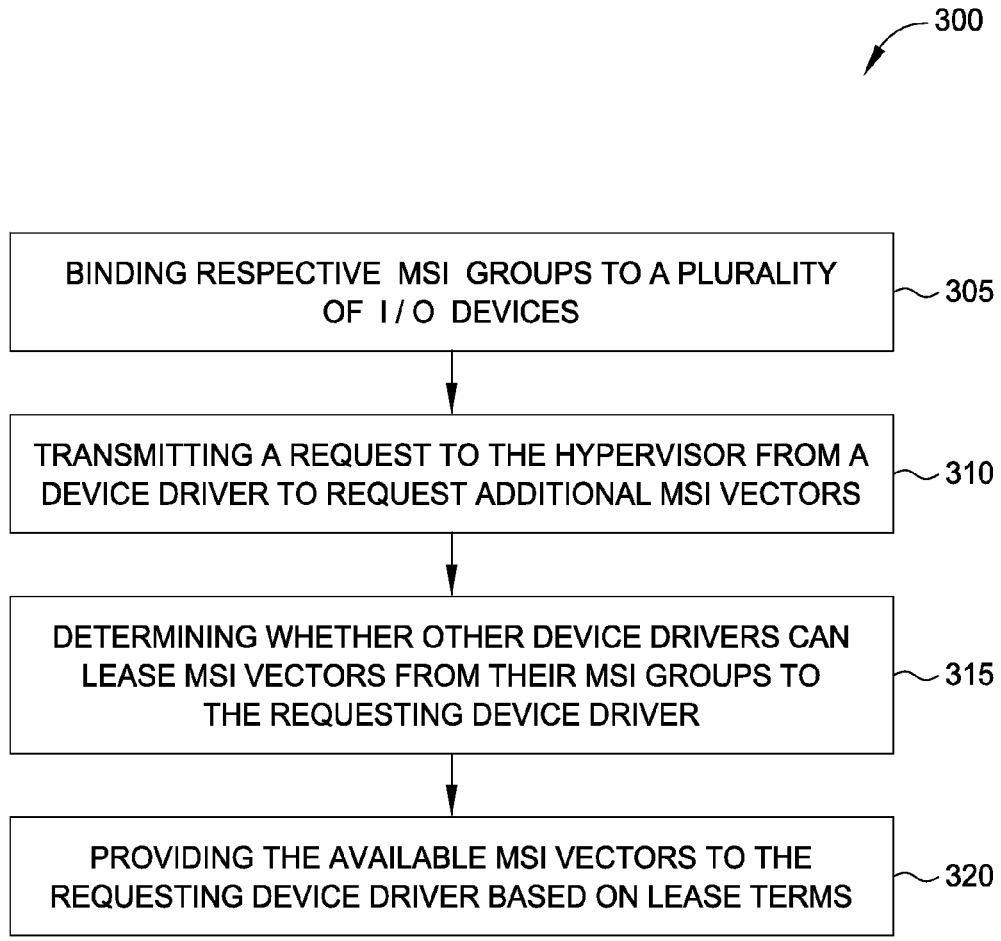
FIG. 3 illustrates a method for borrowing MSI vectors from other I/O devices, according to one embodiment described herein.

FIG. 3 illustrates a method 300 for borrowing MSI vectors from other I/O devices, according to one embodiment described herein. At block 305, as a computer system boots or new I/O devices are coupled to a PHB, device drivers that manage the I/O devices may communicate with the hypervisor for an initial allocation of MSI vectors to assign to the I/O devices. For example, each PHB may be associated with a fixed number of MSI vectors. As more I/O devices are connected to the PHB, the hypervisor allocates and binds a portion of the MSI vectors to the new I/O devices, thereby reducing the number of unallocated MSI vectors that are available (referred to herein as a free pool of MSI vectors).

Figure 4:
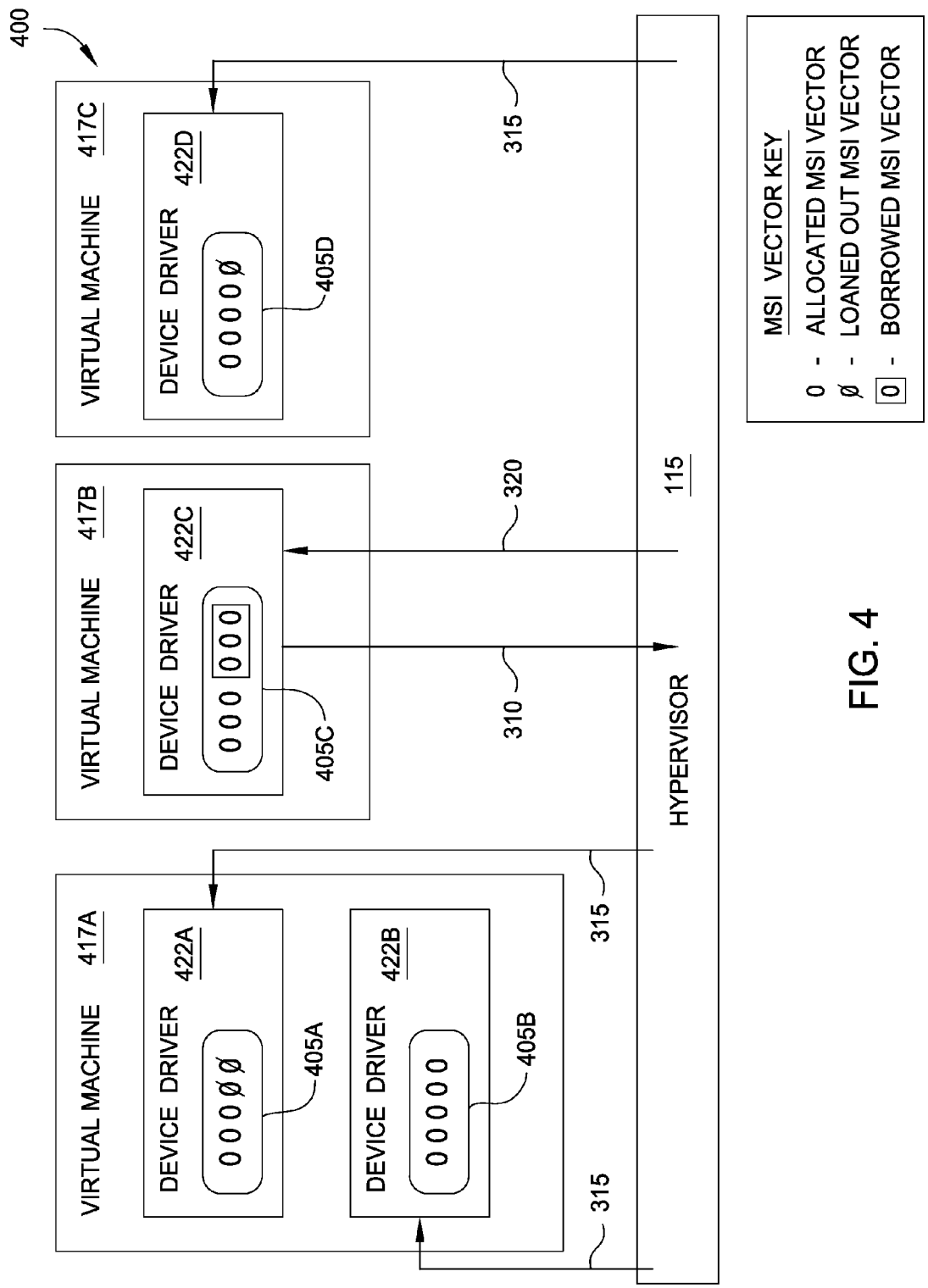
FIG. 4 illustrates a computer system performing the method shown in FIG. 3, according to one embodiment described herein.

FIG. 4 illustrates a computer system 400 performing the method shown in FIG. 3, according to one embodiment described herein. For example, the system 400 includes three virtual machines 417A-C that each include one or more device drivers 422. In one embodiment, the device drivers 422A-D all manage I/O devices that are coupled to the same PHB (not shown). Each device driver 422 includes a MSI vector group 405 illustrating the number of MSI vectors allocated to the I/O devices managed by the device drivers 422. For example, after the computer system 400 is initialized, the I/O devices for drivers 422A, 422B, and 422D are each allocated five MSI vectors in their MSI groups 405 while the I/O device for driver 422C is allocated three MSI vectors as shown by MSI group 422C. The different symbols in the MSI groups 405 will be explained below.

At block 310 in FIG. 3, a device driver transmits a request to the hypervisor for additional MSI vectors. As shown in FIG. 4, the device driver 422C (i.e., the requesting device driver) transmits a request to the hypervisor 115. In one embodiment, the request is in response to a current or expected increase in the DMA writes/reads performed using the I/O device managed by the device driver 422C. That is, there may be a scheduled or unscheduled event that causes the I/O device to want additional MSI vectors. For example, the computer system 400 may perform a system backup every night where the files updated during the day are stored in the I/O device. As such, either before or during the backup, the device driver 422C sends a request to the hypervisor for additional MSI vectors which may reduce the time needed to complete the system backup.

In one embodiment, the request to the hypervisor 115 includes a desired number of additional MSI vectors and a desired lease time. These requests may be based on historical data, the task being performed, current performance metrics, specific user request, and the like. For example, continuing the previous example, if the system backup usually takes an hour, the device driver 422C may set this as the desired lease time. In one embodiment, the device driver 422C may increment the number of MSI vectors that are requested each time the same task occurs until the device driver 422C identifies the optimal number of MSI vector to request. This optimal number may represent the number of MSI vectors needed to complete the task such that there are enough MSI vectors to prevent delays (i.e., there is typically at least one MSI vector that is available to send an interrupt) and without having too many unused MSI vectors (i.e., too many of the MSI vectors in the MSI group are available). In this manner, the device driver 422C may intelligently learn the optimized number of MSI vectors to request and the lease time using historical data. In one embodiment, the one or more of the MSI vectors may be tied to a particular task or thread in the system to allow for parallel processing on the computer system.

Additionally or alternatively, the device driver 422C may be preconfigured to request a certain number of additional MSI vectors and a set lease time based on the task the I/O device is performing. For example, when doing a system backup, the device driver 422C may request a total of 100 MSI vectors for at least fifteen minutes, but when doing payroll, the driver 422C may request a total of 200 MSI vectors for one hour.

In another embodiment, the device driver 422C may monitor performance metrics associated with the I/O device such as processor or memory utilization, work queue, or the number of back up requests to determine the number of MSI vectors to request. For instance, if the processor utilization is at 80%, the driver 422C requests 25% additional MSI vectors, but if the processor utilization is at 90%, the driver 422C requests 50% additional MSI vectors. Moreover, the driver 422C may monitor trends or a rate of change corresponding to the performance metrics. For instance, if the processor utilization keeps increasing, the device driver 422C may request more and more MSI vectors for longer lease times until the utilization begins to fall.

At block 315 in FIG. 3, the hypervisor determines whether other device drivers can lease or loan MSI vectors from their MSI groups to the requesting device driver. As shown in FIG. 4, the hypervisor 115 sends requests to the device drivers 422A, 422B, and 422C (referred to as loaning device drivers). Once a loaning device driver receives a request from the hypervisor 115 to loan out its allocated MSI vectors, the driver may determine whether it is currently utilizing all of its MSI vectors. For example, the I/O device managed by the loaning device driver may currently be using all, or a majority of, its allocated MSI vectors, and thus, does not want to loan out the MSI vectors to prevent its performance from decreasing. Additionally, the loaning device driver may evaluate the desired lease time to see if there are any upcoming scheduled events that take place during the lease time. For example, the desired lease time may be an hour but the loaning device driver may know its I/O device is scheduled to perform a task that requires using the majority (or all) of its allocated MSI vectors. As such, the loaning device driver may deny the request. For instance, in FIG. 4, device driver 422B may have determined not to loan any MSI vectors to requesting device driver 422C. This is illustrated by the MSI group 405B remaining the same size since none of the circles, which each represent an individual MSI vector, are crossed out.

In one embodiment, the loaning device driver may lease only a portion of the additional MSI vectors. For example, the requesting device drive may request four additional MSI vectors but the loaning device driver may be willing to loan only two MSI vectors. In the example shown in FIG. 4, device driver 422A loans two MSI vectors to device driver 422C while device driver 422D loans one MSI vector. The loaned MSI vectors are represented by the crossed out circles symbolizing that the MSI vectors are unbound from the I/O devices managed by drivers 422A and 422D and thus made available for the I/O device associated with device drive 422C.

In one embodiment, the hypervisor 115 may send requests to loaning device drivers 422A, 422B, and 422D in parallel. After receiving replies from the loaning device drivers, if the loaning device drivers offer to share more MSI vectors than were requested, the hypervisor may determine which MSI vectors to borrow. For example, if driver 422C requested three additional MSI vectors and both driver 422A and 422D offered to lease out three MSI vectors, the hypervisor 115 may select to accept all of the MSI vectors from one of the loaning device drivers or accept a portion of the requested MSI vectors from each of the device drivers. FIG. 4 is an example of the latter scenario where two of the requested MSI vectors are borrowed from driver 422A and the other is borrowed from driver 422D. To determine which offer to accept, the hypervisor 115 may consider, for example, a priority associated with the drivers 422 (or their corresponding I/O devices or applications), workload on the corresponding I/O devices, number of MSI vectors already allocated to the loaning device drives, and the like.

Alternatively or additionally, the hypervisor 115 may accept the offer from the loaning device driver with the most favorable lease terms for the requesting device driver. For example, if device driver 422C requested three additional MSI vectors for 1 hour and driver 422B offered to lend three MSI vectors for 45 minutes (e.g., a first counter-offer) and driver 422D offered to lend three MSI vectors for only 30 minutes (e.g., a second counter-offer), the hypervisor may select to borrow the three MSI vectors from driver 422B since the first counter-offer is closest to the request made by device driver 422C. Thus, the hypervisor may choose which offers to accept based on the terms in any counter-offers made by the loaning device drivers. Continuing the example above, assume device driver 422A offers to loan two MSI vectors for 1 hour and a third MSI vector for only 30 minutes. Because device driver 422A offers to loan two MSI vectors for the full hour, the hypervisor 115 may accept these two MSI vectors from driver 422A and one from driver 422B which is loaned for only 45 minutes.

In another example, the total number of MSI vectors the loaning device drivers offer to share may be less than the number of MSI vectors requested by the device driver 422C. For example, device driver 422C may have requested four or more additional MSI vectors but driver 422A was willing to loan only two, driver 422D was willing to loan only one, and driver 422B would not loan out any. In this scenario, the hypervisor 115 may indicate to the requesting device driver 422C that only three additional MSI vectors are available.

In another embodiment, the hypervisor 115 may send a request to the loaning device drivers 422A, 422B, and 422D sequentially. That is, the hypervisor 115 may continue to query the loaning device drivers until all the requested MSI vectors are borrowed or until there are no more loading device drivers remaining to query. In FIG. 4, if device driver 422C requested three additional MSI vectors, the hypervisor 115 may have queried device driver 422A which loaned out two MSI vectors and then queried device driver 422D which provided an additional MSI vector. Thus, device driver 422B may never have received a request from the hypervisor 115. Alternatively, the hypervisor 115 may have queried driver 422B but no MSI vectors were available for loan.

At block 320, the hypervisor informs the requesting device driver of the available MSI vectors and the negotiated terms of the lease. For example, there may be only a portion of the requested MSI vector available for lease or the lease time periods of some or all of the available MSI vectors may be less than what was requested. Nonetheless, based on the information provided by the hypervisor, the requesting device driver binds the available MSI vectors to its corresponding I/O device or devices. The borrowed MSI vectors are represented in FIG. 4 by the circles encapsulated in the boxes. Specifically, device driver 422C has borrowed three MSI vectors—two from device driver 422A and one from device driver 422D. Once the lease time periods expire, the borrowed MSI vectors are unbound from the I/O device and allocated back to the I/O devices of the loaning device drivers 422A and 422D.

Although FIG. 4 illustrates that the MSI vectors in groups 405 are shown within the device drivers 422 in the virtual machines 417, this is for ease of explanation. In one embodiment, the MSI vectors shown in the groups 405A-D are MSI vectors assigned to a single PHB to which the I/O devices managed by the device drivers 422A-D are coupled. The device drivers 422 then communicate with the hypervisor as discussed in method 300 above to reallocate the MSI vectors assigned to the PHB among the various I/O devices as shown in FIG. 2.

Figure 5:
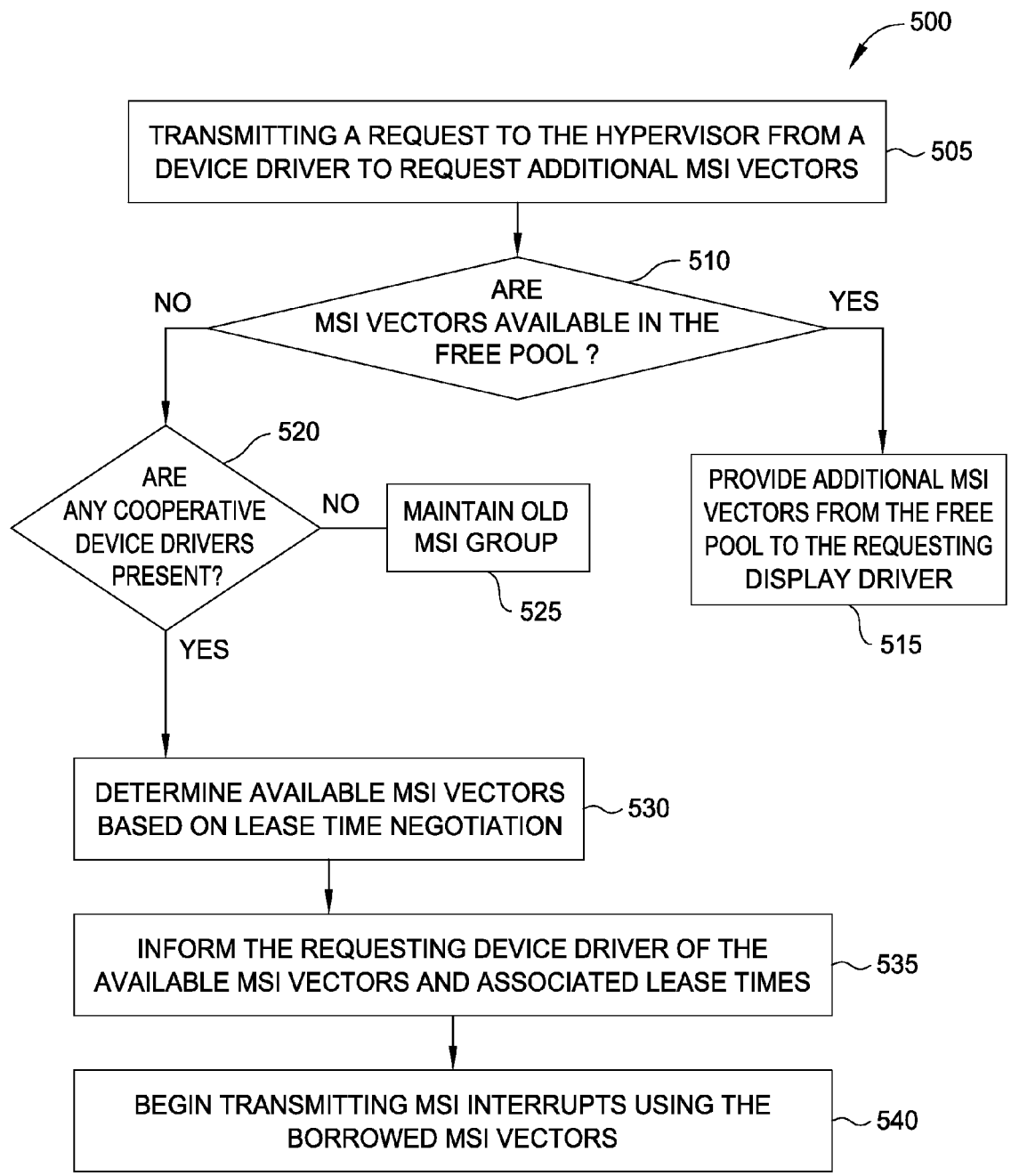
FIG. 5 illustrates a method for borrowing MSI vectors from other I/O devices, according to one embodiment described herein.

FIG. 5 illustrates a method 500 for borrowing MSI vectors from other I/O devices, according to one embodiment described herein. Method 500 begins at block 505 where a device driver transmits a request to the hypervisor for additional MSI vectors. In one embodiment, block 505 may occur after MSI vectors have already been allocated to the I/O device associated with the requesting device driver. A more detailed explanation of block 505 was provided at block 310 of FIG. 3 and will not be repeated here.

At block 510, the hypervisor determines if there MSI vectors available in the free pool corresponding to the PHB coupled to the I/O device. That is, the hypervisor determines which PHB the requesting device drive uses to communicate with its corresponding I/O device and whether that PHB has unallocated MSI vectors (i.e., MSI vectors that are not yet bound to an I/O device). As discussed above, each PHB in the computing system may be assigned a set block of MSI vectors (e.g., 2048 MSI vectors) which can then be allocated or bound to the I/O devices coupled to the PHB. If there are still unallocated MSI vectors in the PHB's free pool, at block 515, the hypervisor provides additional MSI vectors to the vector group assigned to the I/O device of the requesting device driver.

However, if there are no more MSI vectors remaining in the free pool (or not enough to satisfy the request), at block 520, the hypervisor determines if there are any cooperative device drivers present. As used herein, cooperative device drivers are those that indicate to the hypervisor that they are willing to lease out the MSI vectors allocated to their I/O devices to other I/O devices. For example, when I/O devices are initially allocated an MSI vector group, they (or the device drivers) may inform the hypervisor whether they are willing to share the MSI vectors with other I/O devices. The hypervisor maintains a list of the cooperative device drivers. If there are no cooperative device drivers present, at block 525, the hypervisor denies the request and the requesting device driver maintains its old MSI vector group.

However, if cooperative device drivers are present, at block 530, the hypervisor negotiates with these device drivers to determine how many MSI vectors can be borrowed and the lease times associated with those MSI vectors. Negotiating with cooperative device drivers, or more generally, loaning device drivers was discussed in detail in block 315 in FIG. 3 and will not be discussed here.

At block 535, the hypervisor informs the requesting device driver of the available MSI vectors and associated lease times. If the cooperative device drivers were unable to loan out enough MSI vectors to satisfy the request, the hypervisor may nonetheless inform the requesting device driver of the available MSI vectors. Moreover, the lease times with some or all of the available MSI vectors may be different than what was requested by the device driver. For example, the requesting device driver may have asked to borrow the MSI vectors for an hour but the cooperative device drivers may be willing to lend out the MSI vectors for thirty minutes.

At block 540, the borrowed MSI vectors are bound to the I/O device which can then begin using the MSI vectors to transmit interrupts to applications and hardware in the computer system. As the lease times expire, the I/O device unbinds the borrowed MSI vectors which are returned to the cooperative device drivers.

Figure 6:
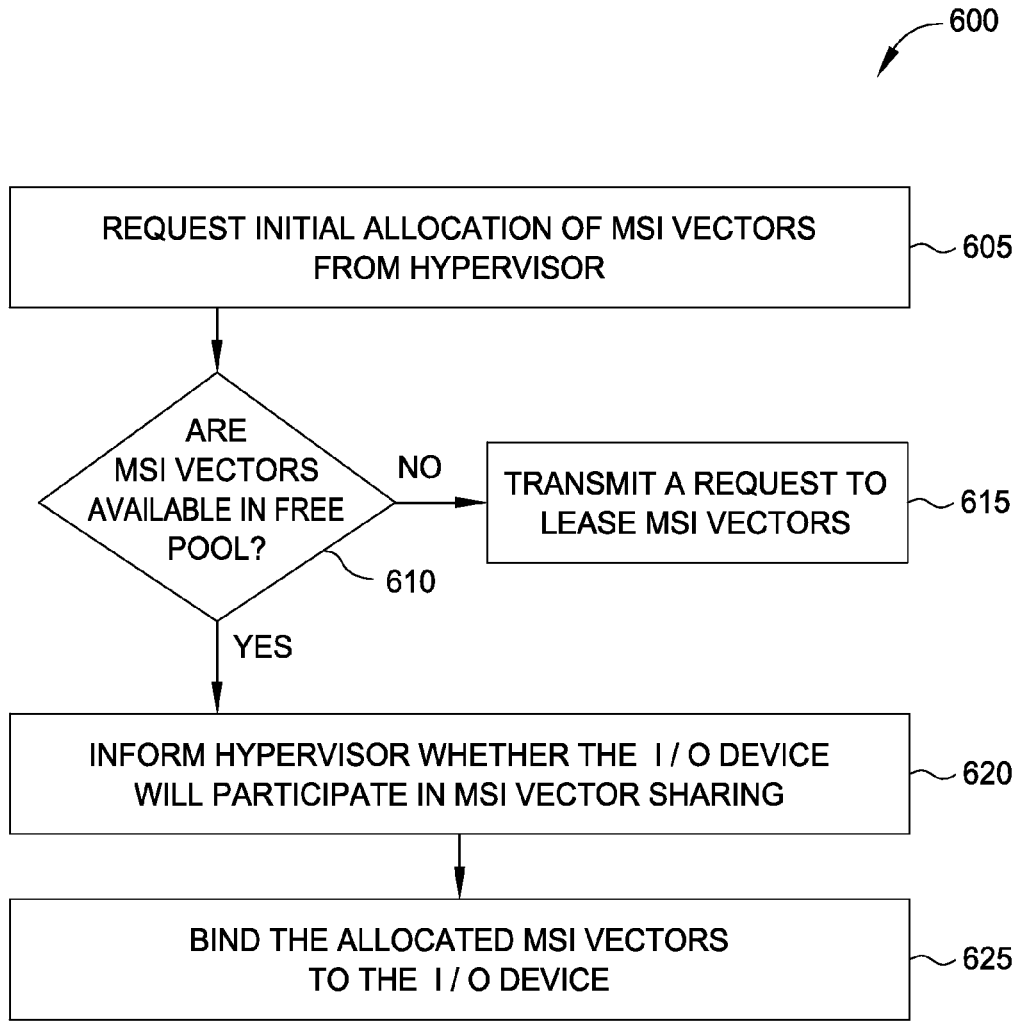
FIG. 6 illustrates a method for binding MSI vectors to an I/O device, according to one embodiment described herein.

FIG. 6 illustrates a method 600 for binding MSI vectors to an I/O device, according to one embodiment described herein. Method 600 begins at block 605 where a hypervisor receives a request from a I/O device or a device driver managing the I/O device to allocate a MSI vector group to the I/O device. In one embodiment, the I/O device may request a certain number of MSI vectors, but in another embodiment, the hypervisor may be configured to provide a predetermined number of MSI vectors to each I/O device. However, in one embodiment, the MSI vectors allocated during method 600 are not borrowed, and thus, there is no lease time associated with the MSI vectors. In one embodiment, the I/O device is allocated the MSI vectors so long as it remains communicatively coupled to the PHB.

At block 610, the hypervisor determines if there are unallocated MSI vectors remaining in the free pool of the PHB connected to the I/O device. If not, at block 615, the hypervisor may determine if there are device drivers willing to lease MSI vectors to I/O device as described in FIGS. 3 and 5. Moreover, in one embodiment, the computer system may permit the I/O device to use LSI for transmitting interrupts. However, if unallocated MSI vectors are available, the hypervisor allocates at least some portion of the MSI vectors to the I/O device to create its MSI vector group.

At block 620, the I/O device or its device driver informs the hypervisor whether the I/O device is willing to participate in MSI vector sharing as described in method 500 in FIG. 5. If so, its device driver is designated as a cooperative device driver and is queried if, for example, another I/O device coupled to the PHB requests to borrow additional MSI vectors.

At block 625, the allocated MSI vectors are bound to the I/O device thereby enabling the I/O device to use the MSI vectors to transmit interprets to different elements in the computing system. Moreover, if another I/O device requests via its device driver additional MSI vectors, some or all of the allocated MSI vectors may be lent to the requesting device driver for a lease time. Once the lease time expires, the MSI vectors are returned to the I/O device and again added to its MSI vector group.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   upon receiving a first request to increase Message Signaled Interrupt (MSI) resources allocated to a first Peripheral Component Interconnect (PCI) enabled Input/Output (I/O) device coupled to a PCI Host Bridge (PHB), identifying at least a second PCI-enabled I/O device that is allocated MSI resources;
   transmitting a second request to a managing entity corresponding to the second I/O device, the second request indicating a desired number of MSI resources and a desired lease time;
   receiving a confirmation from the managing entity, the confirmation indicating a number of MSI resources available for lease from the second I/O device and a negotiated lease time associated with each of the MSI resources available for lease; and
   allocating at least one of the MSI resources available for lease to the first I/O device.

2. The method of claim 1, wherein the first and second I/O devices are both coupled to PCI slots associated with the same PHB.

3. The method of claim 1, wherein the number of MSI resource available for lease is less than the desired number of MSI resources, wherein the managing entity is a device driver that configures the I/O device.

4. The method of claim 1, further comprising:
   transmitting the second request to a plurality of device drivers that is each associated with at least one PCI-enabled I/O device; and
   determining a total number of MSI resources the plurality of device drivers are willing to lend,
   wherein allocating the MSI resources to the first I/O device comprises allocating at least two MSI resources to the first I/O device that were previously assigned to at least two different I/O devices.

5. The method of claim 4, wherein the total number of MSI resources the plurality of device drivers is willing to lend are greater than the desired number of MSI resources.

6. The method of claim 1, further comprising, before transmitting the second request to the managing entity and upon determining the PHB includes unallocated MSI resources in a free pool, allocating to the first I/O device at least one of the MSI resources in the free pool.

7. The method of claim 1, wherein, before receiving the first request to increase the MSI resources allocated to the first I/O device, the first I/O device was previously allocated one or more MSI resources.

* * * * *